June 29, 1943.    P. O. McDERMOTT    2,322,865
MEANS FOR ERADICATING TULES
Filed Dec. 2, 1940
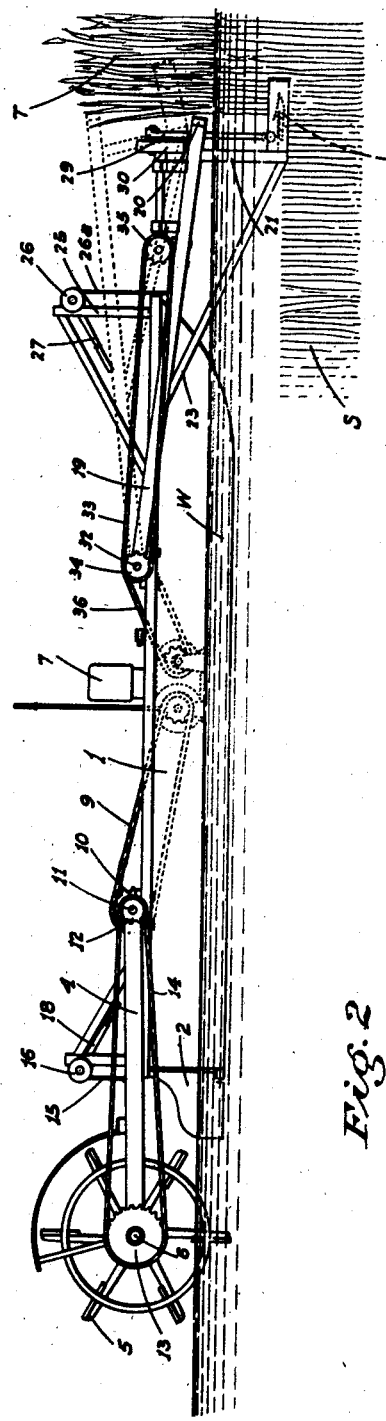
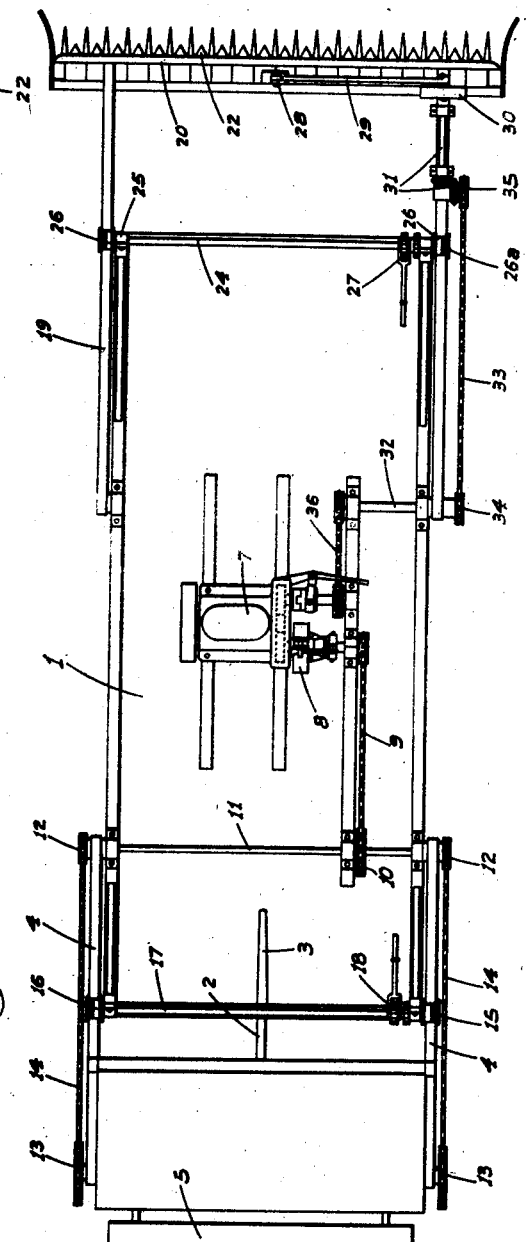
INVENTOR.
Perry O. McDermott
BY
*Webster Herbster*
ATTORNEYS Patented June 29, 1943

2,322,865

UNITED STATES PATENT OFFICE 2,322,865

MEANS FOR ERADICATING TULES

Perry O. McDermott, Los Banos, Calif.

Application December 2, 1940, Serial No. 368,109

2 Claims. (Cl. 56—8)

This invention relates in general to a method and apparatus for controlling the undesirable growth of tules or other similar water plants in areas such as waterways, lakes, ponds for water fowl in game preserves, etc. The rank growing tules and the like have become a serious problem in certain localities as they soon choke up the waterways, lakes, ponds, etc., and heretofore no effective control has been available.

It is therefore the principal object of this invention to provide a novel method of and means for eradicating tules: the method essentially comprising the steps of repeatedly severing the tule stalks, during the growing season, some distance below the water level whereby to cut off air admission to the roots; while the apparatus consists of what may be termed a tule cutting boat.

A further object of the invention is to provide a tule cutting boat which includes a power driven mowing mechanism operative to mow the tules in a plane some distance below the water level.

An additional object of the invention is to provide a tule cutting boat which includes a shallow draft hull and propelling apparatus; the cutting mechanism being disposed below the water level horizontally and transversely ahead of the hull, of a width at least as great as that of the hull, and positioned to mow the tules in a plane below the bottom of the hull, whereby the hull can proceed over the mowed stumps or stalks of the tules without dragging thereon.

Another object of the invention is to provide a tule cutting boat wherein the mowing mechanism, as well as the hull propelling mechanism are independently and vertically adjustable whereby both the depth of cutting and the depth of entry of the propelling means into the water can be regulated as desired.

It is also an object of the invention to provide a tule cutting boat which is constructed sturdily and yet is of relatively light weight so that it may be transported from place to place on a trailer or truck.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is a side elevation of the boat in operation, and illustrates the method.

Figure 2 is a top plan of the boat.

Referring now more particularly to the characters of reference on the drawing, the tule cutting boat comprises a substantially flat bottomed, light weight and shallow draft scow type hull 1 which is open topped and rectangular in plan. A conventional rudder 2, provided with a suitable tiller 3, is mounted on and projects from the stern of the hull.

A pair of parallel, transversely spaced arms 4 are pivoted at their forward ends on the hull outwardly of the sides thereof, adjacent the stern, for vertical swinging movement. A relatively small diameter paddle wheel 5 extends between said arms and the paddle wheel shaft 6 is journaled at its ends in connection with the rear end portions of arms 4.

A small gas engine 7 of suitable type is mounted in the hull centrally thereof and through a clutch and reverse gear unit 8 drives an endless chain 9 which engages a sprocket 10 on a shaft 11 which is journaled on and extends transversely of the hull, and which is also the axial shaft of arms 4; the outer ends of said shaft projecting outwardly of said sides of the hull. Said outer ends of shaft 11 are fitted with sprockets 12, while the outer ends of paddle wheel shaft 6 are likewise fitted with sprockets 13 of somewhat greater diameter; sprockets 12 and 13 being alined and endless chains 14 extending between corresponding sprockets 12 and 13 in driving relation. It will thus be seen that when the gas engine is operating, and clutch 8 engaged, the paddle wheel 5 will be rotated and the direction of rotation is such as to propel the hull forwardly.

In order to control the depth which the paddle wheel enters the water, the arms 4 intermediate their ends are suspended from flexible cables 15 which at their upper ends wind about relatively small drums 16 on the outer ends of a transverse shaft 17 supported from the hull. This shaft has a conventional ratchet and lever unit 18 associated therewith in order to effect rotation of the shaft when desired and otherwise to prevent cables 15 from running off the drums 16. Proper manipulation of ratchet and lever unit 18 will of course raise or lower arms 4 and alter the depth which the paddle wheel enters the water.

The mowing mechanism which is carried by the hull 1 comprises the following:

Arms 19 are pivoted at their rear ends on the forward portion of the hull adjacent but outwardly of the sides thereof and project forwardly in parallel relation to a point ahead of the bow of the hull. A cross bar 20 rigidly connects the outer ends of arms 19 and at its ends projects some distance therebeyond, as clearly shown in Fig. 2. Brackets 21 depend from arms 19 adjacent their forward ends, and at their lower ends such brackets are connected with and rigidly support a transversely extending, horizontal mower 22 which is of greater width than the hull and extends beyond its sides. This mower is of the reciprocating type, and in general construction is substantially the same as used in connection with common field type mowers, although it will be constructed and lubricated for under water operation. Suitable bracing members 23 extend forwardly and downwardly from arms 19 to brackets 21 adjacent the lower end of the latter; such bracing members preventing rearward deflection of the mower when in operation. The brackets 21 are of such height that when the mower 22 is disposed at proper cutting depth in the water, the forward ends of arms 19 are above the surface of the water.

A horizontal cross shaft 24 is journaled on uprights 25 on the bow of the hull; such shaft having relatively small drums 26 on the ends thereof, and flexible cables 26a connect at one end with the arms 19, while at the other end are connected to and wind about said drums. Rotation and control of the shaft 24 to effect raising and lowering of arms 19, and resultant regulation of the cutting depth of the mower, is accomplished by means of a conventional ratchet and lever unit 27 mounted in connection with said shaft.

The knife bar of the mower 22 is provided with a centrally disposed upstanding element 28 which is connected by means of a pitman 29 with an eccentric 30 mounted on one of the arms 19 adjacent its forward end. This eccentric is driven by means of a bevel gear and shaft assembly 31. A transversely extending shaft 32 is suitably journaled on the hull and projects beyond the side thereof through and concentrically of the pivotal mounting for the rear end for the arm 19 which supports the eccentric; the gear and shaft assembly 31 being driven from shaft 32 by a chain 33 which extends about sprockets 34 and 35 mounted on the outer end of shaft 32 and with said gear and shaft assembly 31, respectively. Shaft 32 is driven from the engine 7 by a suitable clutched drive assembly 36.

In use, the hull of the boat floats relatively high in the water W and the paddle wheel 5 is adjusted so that it enters the water to a depth not substantially greater than does the bottom of the hull. The mower 22 is adjusted so that it is disposed approximately twelve or fourteen inches below the water level and which is below the bottom of the hull. As the boat advances, and with operation of the mower 22, the tules T are severed a substantial distance below the surface of the water, the upper and cut portions of the tules being deflected from the pitman and adjacent mechanism by means of cross bar 20. The upper ends of the remaining stalks or stumps S of the tules are below the bottom of the boat and this fact, taken with the fact that the mower 22 is of greater width than the hull, allows the hull to pass freely over such stumps without dragging or scraping thereon.

By severing the tules a substantial distance below the surface of the water the tule stumps S and their roots have no access to air, which tends to retard recurring growth of such stumps. In addition, the mowing operation is repeated two or three times during a growing season which results in effective drowning of these portions of the tules which remain under water, and as a result the tules do not sprout and grow during subsequent seasons.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In a tule cutting apparatus which includes a water borne hull and a transverse reciprocating type mower disposed when in operation below the bottom of the hull, means to drive the mower including a transversely extending pitman above the mower and a transverse bar mounted in fixed connection with and above the mower in front of the pitman.

2. In a tule cutting apparatus which includes a water borne hull and a transverse reciprocating-type mower disposed when in operation below the water level, means supporting the mower from the hull and including side arms, means to drive the mower including a rotary member mounted on one arm with its axis extending lengthwise of said arm and a pitman extending lengthwise of said member and the mower; and a rigid bar extending between and secured on the side arms ahead of the pitman.

PERRY O. McDERMOTT.